L. E. WHITE.
CONNECTING DEVICE.
APPLICATION FILED JAN. 29, 1918.
1,262,419.
Patented Apr. 9, 1918.
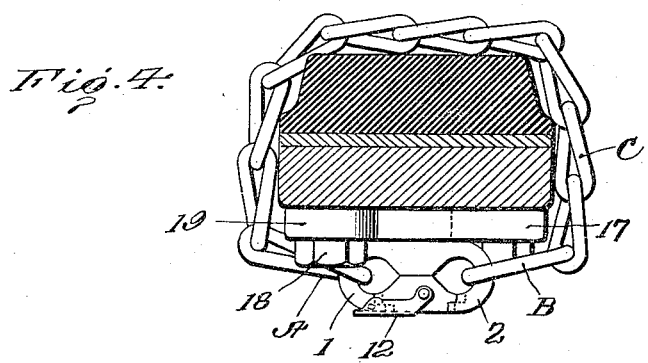
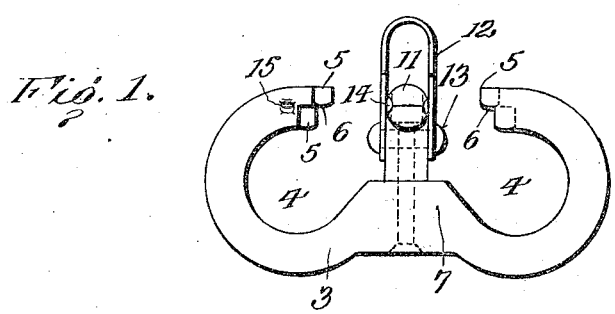
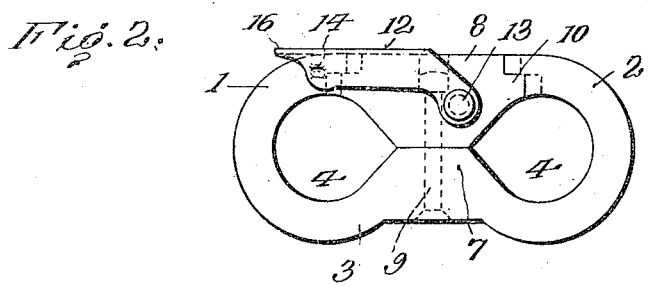
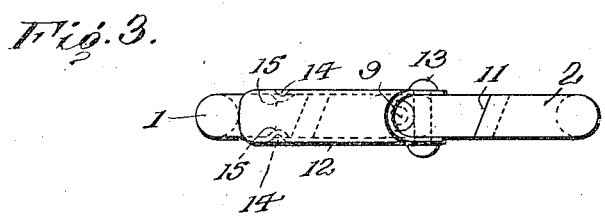
Inventor
Leverett E. White
By Wm H Babcock & Son
Attorneys

UNITED STATES PATENT OFFICE.

LEVERETT E. WHITE, OF SPRINGFIELD, MASSACHUSETTS, ASSIGNOR TO THE STEEL PRODUCTS COMPANY, OF HARTFORD, CONNECTICUT, A CORPORATION OF CONNECTICUT.

CONNECTING DEVICE.

1,262,419.

Specification of Letters Patent.

Patented Apr. 9, 1918.

Application filed January 29, 1918. Serial No. 214,365.

*To all whom it may concern:*

Be it known that I, LEVERETT E. WHITE, a citizen of the United States, residing at Springfield, in the county of Hampden and State of Massachusetts, have invented certain new and useful Improvements in Connecting Devices, of which the following is a specification.

This invention relates to connecting devices for connecting the terminal links of a chain or chains, either to a fixed eye or to each other, and has for its objects to provide a strong solid metal open connector with a pivoted guard turning in one plane and a resilient lock mounted thereon and turning therewith and adapted to turn on its pivotal point in a plane at right angles thereto; to keep the two terminal links in their respective eyes or on the respective hooks of the connector or of their respective connectors and separated from the fixed eye, thus guarding against their becoming superimposed on said eye or on each other and, by twisting, moving the guard or keeper on its pivot; and further to provide locking means for said guard or keeper to prevent the same from turning on its pivot either by vibration, gravity or the action of said terminal links.

This invention has primarily in view the anchoring of the two ends of an anti-skidding chain or chains of the anchored type to the closed eye of a clamp or similar device or plate attached to a truck wheel or the embodiment of the features of this invention to such a plate or clamp, but is capable, nevertheless, of utilization with good results in many arts.

As the invention resides solely in the connector the fixed eye and the plate or clamp carrying said eye have not been shown.

In the accompanying drawings:

Figure 1 represents a side elevation of a connector embodying my invention, the keeper or guard being in open position;

Fig. 2, a similar view, closed;

Fig. 3, a top plan view of the connector; and

Fig. 4, a cross-sectional view through the tire, felly and rim of a wheel, showing a modified form of my invention applied thereto and receiving and connecting the terminal links of an anti-skidding chain.

Referring now in detail to the drawings, 3 indicates the body of the connector having its ends turned over and inward toward each other to form hooks 1 and 2. The free ends of these hooks are provided with parallel beveled faces 5 and are undercut to provide shoulders 6 presented toward the opposite side of their respective eyes.

The body of the connector 1 is preferably provided with a dividing flattened hump 7, on which is mounted a keeper or guard 8 by means of a pivotal pin 9 passing through the central portions of said hump 7 and said keeper 8 and preferably held in position by spreading or enlarging the ends thereof, or in any other suitable manner. The hump 7 and keeper or guard 8 divide the space between the hooks 1 and 2 into eyes 4.

The keeper or guard 8 has its end portions beveled at 11 in the corresponding direction and in corresponding degree to the adjacent ends of the hooks 1 and 2 and has its end portions cut away to form shoulders 10 presented toward the shoulder 6 of said hooks 1 and 2 and is of such dimensions that in closed position, when the sides of said keeper 8 are flush with the sides of the hooks 1 and 2, the beveled faces 5 and 11 and the opposing faces of the shoulders 6 and 10 will be in engagement, thus preventing any movement in any direction.

To lock the keeper or guard 8 in this position I provide a lock or bridle 12 of resilient metal, of bifurcated form, having one end pivotally connected to the keeper or guard 8 by means of a pivot pin 13 and having the bifurcations of the other, and free, end provided with registering integral lugs 14 stamped in the metal and snapping into corresponding registering lateral recesses 15 in the sides of hook 1, thus locking the guard or keeper 8 against turning movement out of the closed position. Of course, the interval between the bifurcations of the free end of lock or bridle 12 corresponds to the thickness or width of the hook 1.

Also, of course, the hooks 1 and 2 are to be of such dimensions as will permit the usual size link of an anti-skidding chain of standard construction to be passed over the free ends respectively thereof.

The free end of the bridle is provided with an extension 16, see Figs. 1 and 4, so that any convenient nail or tool may be inserted thereunder for purposes of prying the lock or bridle 12 open.

In the modification shown in Fig. 4, the connector is either cast or forged integral with, or otherwise secured to, a felly plate 17, which is fastened to the felly of the wheel by means of lag screws 18 passing through perforated lugs 19 of said felly plate. Otherwise the construction and operation is the same as that shown in Figs. 1 to 3, the terminal links A and B of the anti-skidding chain C being connected thereby.

Any suitable material may be used for any part.

Having thus described my invention, what I claim as new and desire to secure by Letters Patent is:

1. A device to connect two endless elements, consisting of a part having two hooks presented substantially toward each other, leaving an open space between their ends, in combination with a guard mounted between said hooks for pivotal movement, said guard in normal position guarding said open space, and a lock mounted on said guard and having a portion adapted to engage one of said hooks when said guard is in normal position, to lock the latter in said position, the end of one of the hooks and one of the ends of the guard being so formed as to prevent a complete rotation of the latter.

2. A device to connect two endless elements, comprising two hooks having their free ends presented substantially toward each other, and a dividing hump located between said hooks, in combination with a guard pivotally mounted on said hump and normally extending adjacent the free ends of said hooks and a locking bridle of resilient metal pivotally mounted on said guard to move in a plane at an angle to the plane of movement of said guard and adapted to snap over and embrace one of said hooks when said guard is in normal position.

3. A device to connect two endless elements, comprising two hooks having their free ends presented substantially toward each other, and a dividing hump located between said hooks, in combination with a guard having beveled ends and pivotally mounted on said hump and normally extending to the free ends of said hooks, which are also correspondingly beveled, and a locking bridle having a resilient portion and mounted on said guard in such manner that when the latter is in normal position said lock may be moved to engage one of said hooks with said resilient portion to lock said guard in normal position.

4. A device to connect two endless elements, comprising two hooks having their free ends beveled on parallel lines and undercut to form shoulders, and a dividing hump located between said hooks, in combination with a guard pivotally mounted on said hump, extending to the free ends of said hooks and having its end portions beveled in the corresponding direction and in corresponding degree to the adjacent ends of the respective hooks and cut away to form shoulders presented toward the respective shoulders of said hooks, and a locking bridle pivotally mounted on said guard and having a portion adapted to engage and grip one of said hooks when said guard is in normal position with the faces of the shoulders of said guard and hooks, and the beveled faces of said guard and hooks in engagement.

In testimony whereof, I have signed my name to this specification in the presence of two subscribing witnesses.

LEVERETT E. WHITE.

Witnesses:
WILLIAM H. McLAUGHLIN,
EDMUND BARTLETT.

Copies of this patent may be obtained for five cents each, by addressing the "Commissioner of Patents, Washington, D. C."